May 8, 1951 G. J. SIEZEN 2,552,464

COLOR TELEVISION

Filed May 7, 1948 7 Sheets-Sheet 1

INVENTOR.

GERRIT JAN SIEZEN

BY

Lee B. Lemon

ATTORNEY

May 8, 1951 G. J. SIEZEN 2,552,464

COLOR TELEVISION

Filed May 7, 1948 7 Sheets-Sheet 2

INVENTOR.

GERRIT JAN SIEZEN

BY [signature] ATTORNEY.

INVENTOR.
GERRIT JAN SIEZEN
BY [signature]
ATTORNEY.

INVENTOR.
GERRIT JAN SIEZEN
BY
ATTORNEY.

INVENTOR.
GERRIT JAN SIEZEN
BY
ATTORNEY

INVENTOR.
GERRIT JAN SIEZEN
BY
ATTORNEY.

May 8, 1951 G. J. SIEZEN 2,552,464

COLOR TELEVISION

Filed May 7, 1948 7 Sheets-Sheet 7

INVENTOR.

GERRIT JAN SIEZEN

BY

ATTORNEY.

Patented May 8, 1951 2,552,464

UNITED STATES PATENT OFFICE 2,552,464

COLOR TELEVISION

Gerrit Jan Siezen, Eindhoven, Netherlands, assignor to Hartford National Bank and Trust Company, Hartford, Conn., as trustee Application May 7, 1948, Serial No. 25,624
In the Netherlands June 10, 1947

20 Claims. (Cl. 178—5.2)

Figure 1:
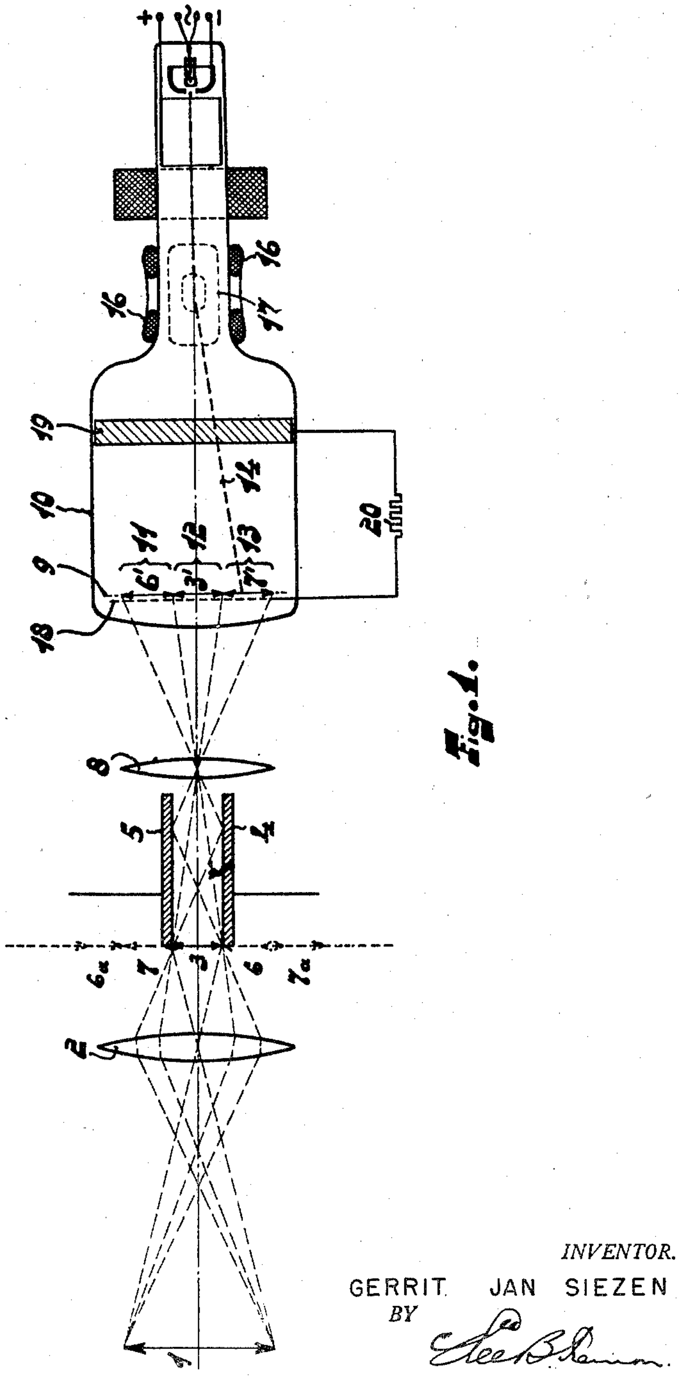

The invention relates to a system for the transmission of stationary or animated coloured pictures.

For the transmission of coloured pictures mechanico-electronical and fully electronical systems are known.

The recording apparatus of a known mechanico-electronical system comprises, for example, an iconoscope the mosaic screen of which is illuminated in succession by three fundamental colours, from which the picture is built up. This is effected with the use of a rotary disc which comprises three kinds of segments, each of which allows only one fundamental colour to pass.

The receiving apparatus comprises a cathode-ray tube, in which the intensity of the cathode-ray beam is modulated in accordance with the brightness values, which in the transmitter are successively observed for each of the colours. The successively transmitted images are united to form one picture with the use of a disc which is built up from filters, and which is isochronous with that at the transmitting end.

Such a system has several limitations in that, for example, the receiver comprises moving parts. In addition, the disc used absorbs a high proportion of light and the fluorescent material of the cathode-ray tube is required to comprise three colour components, which must correspond to the pass ranges of the filters in the disc. Finally, it should be noted that the isochronous running of the discs introduces supplementary complications in the circuit-arrangement.

In a known fully-electronic system use is made of three separate transmission channels for the three fundamental colours. The signals in these three channels consequently correspond, for example, to the red, green and blue image content of the picture to be transmitted such as it is obtained at the transmitter end by continuous scanning.

At the receiver end these three signals are fed to three different cathode-ray tubes each of which comprises a screen, the screens being provided with red, green and blue fluorescent material respectively. With the use of three optical systems the images thus obtained are united to form one coloured picture.

As disadvantages of such a system we may mention inter alia the use of three separate channels, of three separate cathode-ray tubes, which are required to be identical from an optical-electronic point of view particularly with respect to deflecting members, and three separate optical systems, the proper alignment of which is difficult to achieve but necessary for accurate picture synthesis.

The invention relates more particularly to a system of equally known character, in which, at the transmitter end, the picture to be transmitted is projected simultaneously and in multiple onto the light-sensitive screen of an image-camera tube, each of the charge distributions brought about on the screen by each of the projected images corresponding to a definite colour content of the picture to be transmitted. A corresponding number of images orientated in a corresponding manner and corresponding to the corresponding colour content are produced in this system at the receiver end on the luminescent screen of the reproducing tube, these images being assembled by optical means to form one picture.

Such a system is free from most of the aforesaid disadvantages, but its use has hitherto been frustrated primarily by the difficulty of multiple projection at the transmitter end and by the difficulty of assembling the multiple images into a single picture at the receiver end.

The system according to the invention obviates these disadvantages and exhibits the feature that each pair of adjacent projections on the screen of the image-camera tube has image symmetry and the various images produced on the screen of the reproducing tube are assembled to form one picture with the use of a kaleidoscopic optical system.

If indeed the various images on the mosaic screen of the image-camera tube at the transmitter end are situated so that each pair of adjacent images has image symmetry, then adjacent images at the receiver end also exhibit image symmetry. A kaleidoscopic system, which built up from a number of flat mirrors, all of which are arranged parallel to the same axis, provides, in a simple manner, for a coincidence of image-symmetrical images upon reflection by one or more mirrors of the kaleidoscopic system.

In a preferred embodiment of the system according to the invention the multiple projection at the transmitter end is carried out with the use of an unambiguously kaleidoscopic-optical system and the reassembling of the multiple images at the receiver end is carried out with a kaleidoscopic optical system identical with that at the transmitter end.

The term "unambiguously kaleidscopic-optical system" is here understood to mean a system in which, upon reflection of an object by this system, only virtual images which do not overlap one another are formed. Simple consideration reveals that this condition is invariably fulfilled if the angle included between two non-parallel mirrors does not exceed 90°. However, it should be noted that the overlapping ranges at the picture and are restricted to definite zones only, so that it suffices if the said ranges cannot be viewed from any point of the aperture of the optical system, which permits of using mirrors which are at an angle exceeding 90°.

In order that the invention may be more clearly understood and readily carried into effect, it will now be described more fully with reference to the accompanying drawing, which shows a system according to the invention and forms of transmitting and receiving devices for use in this system.

Figure 2:
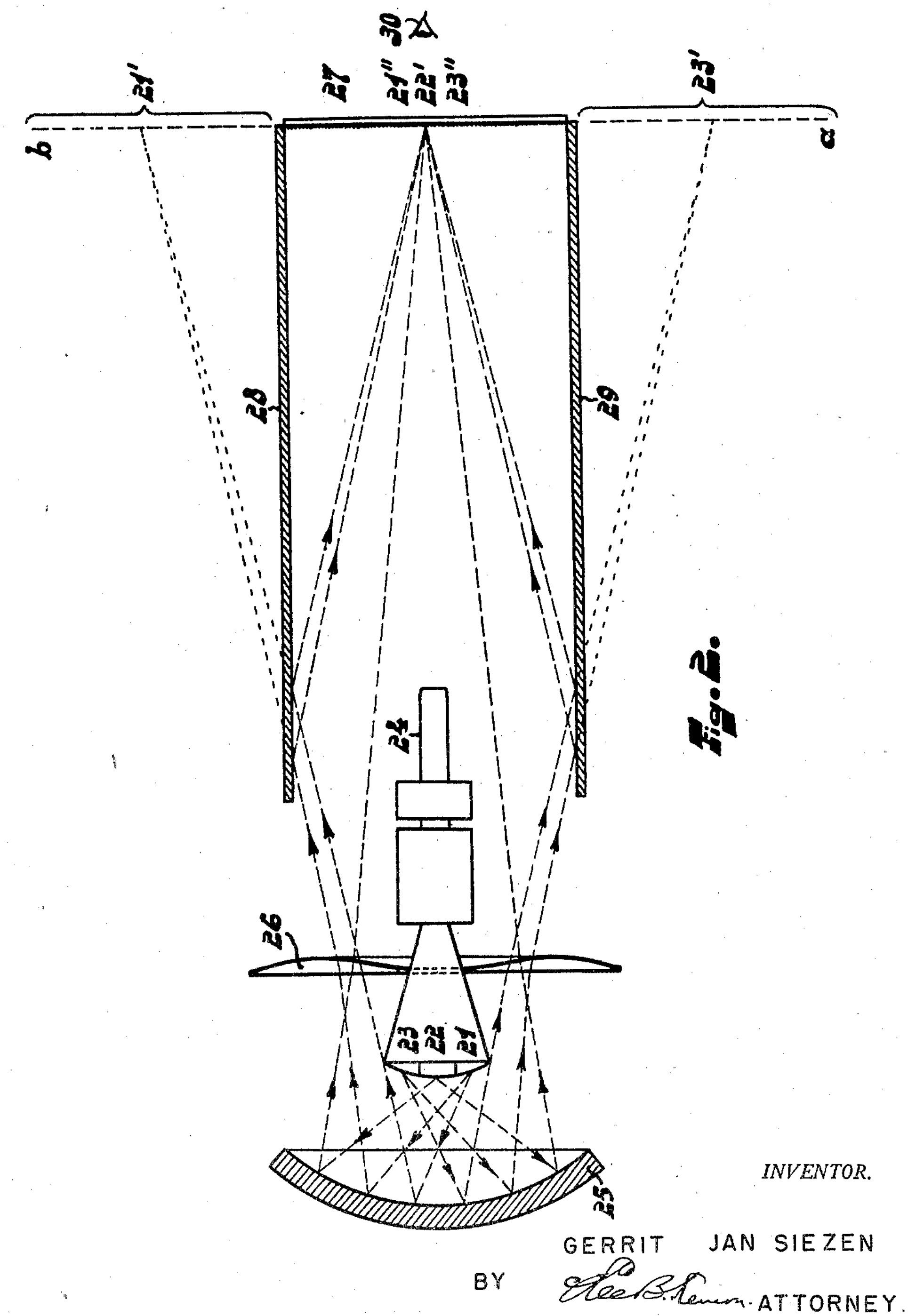
Figures 3, 4:
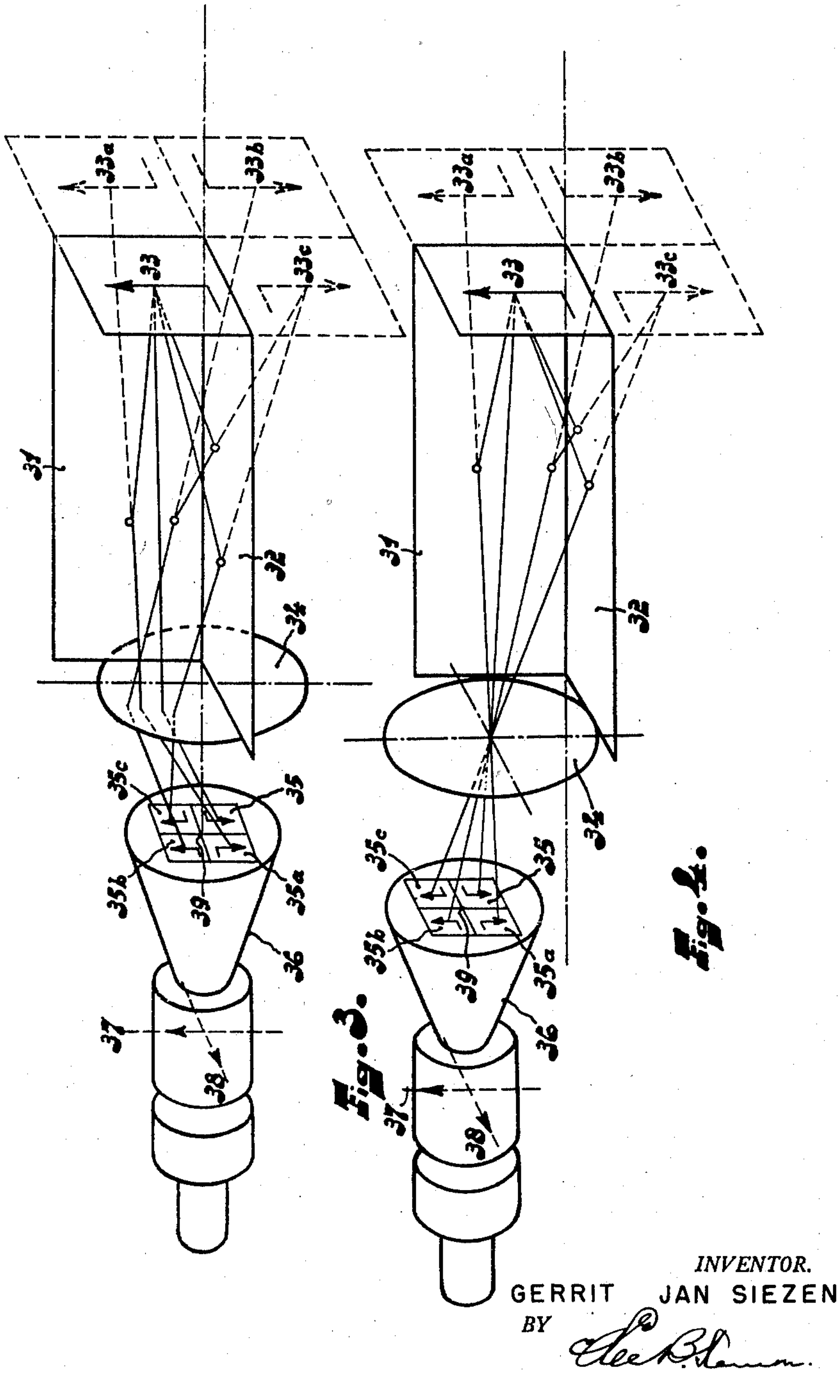
Figure 5:
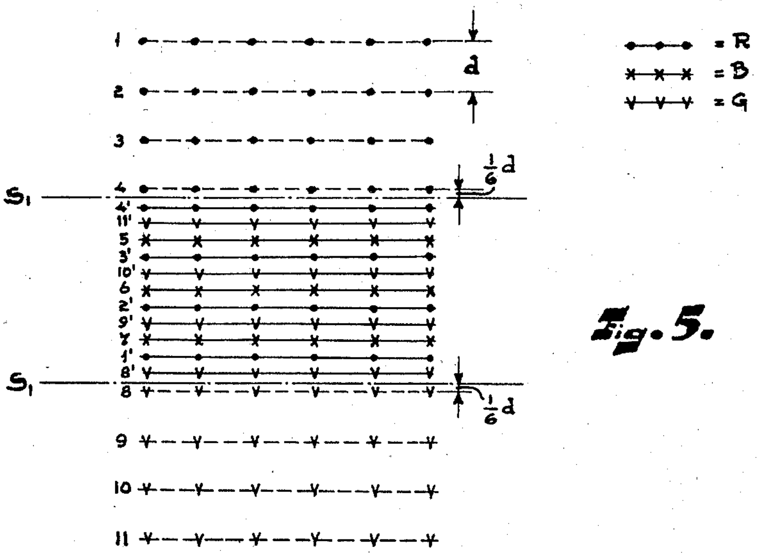
Figure 6:
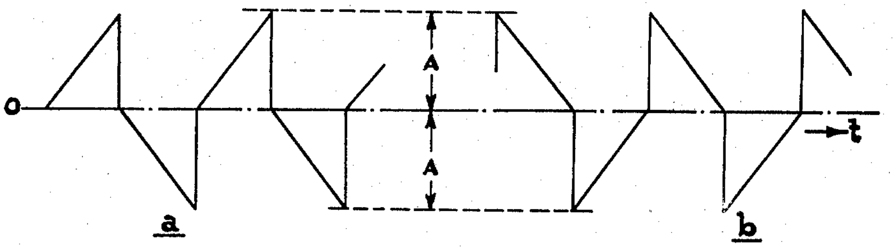
Figure 7:
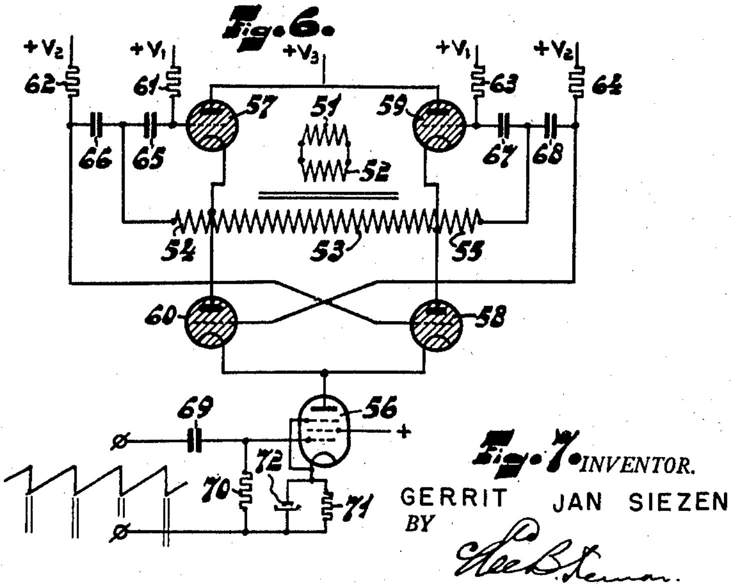
Figure 8:
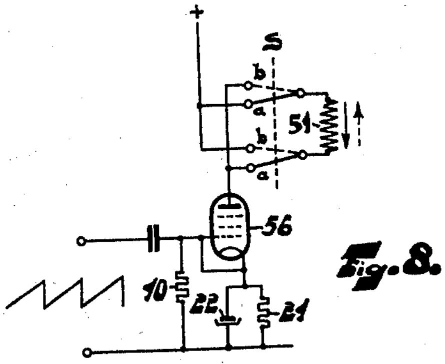
Figure 9:
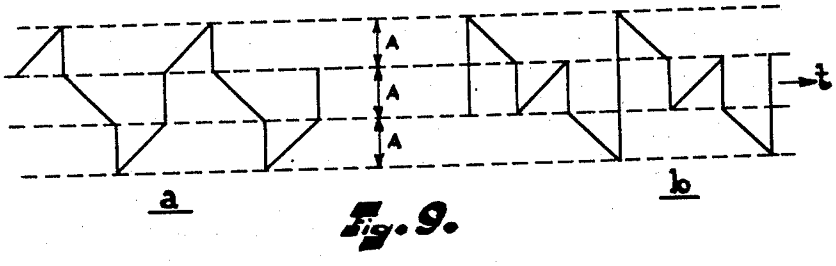
Figure 10:
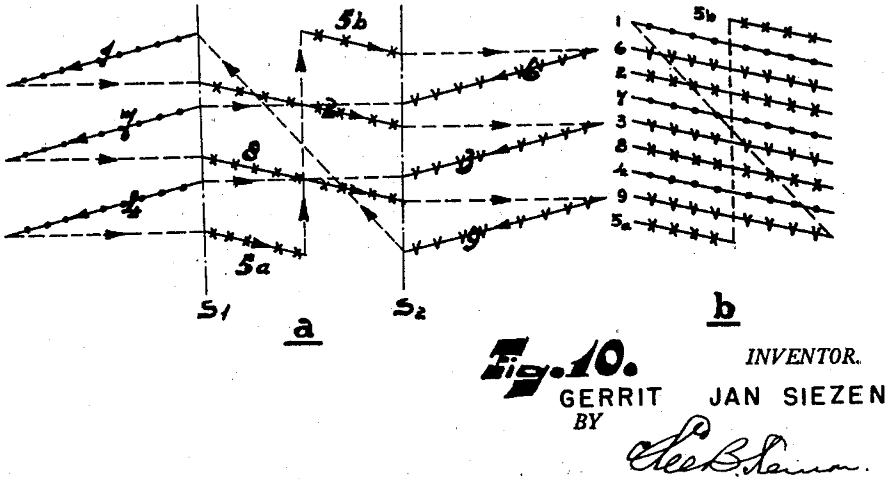
Figure 12:
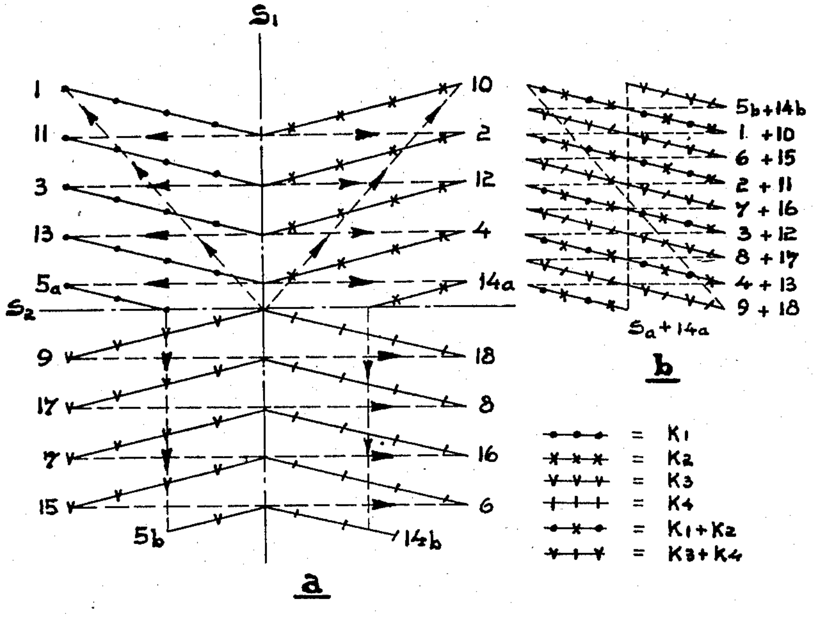
Figure 13:
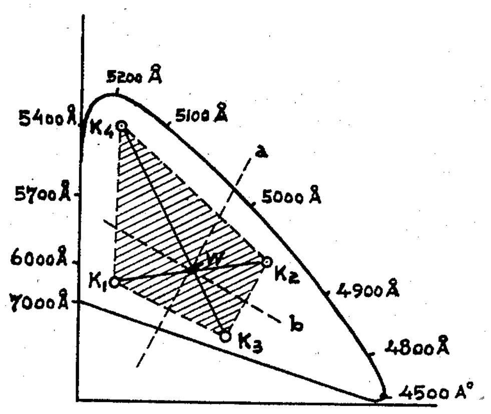
Figure 11:
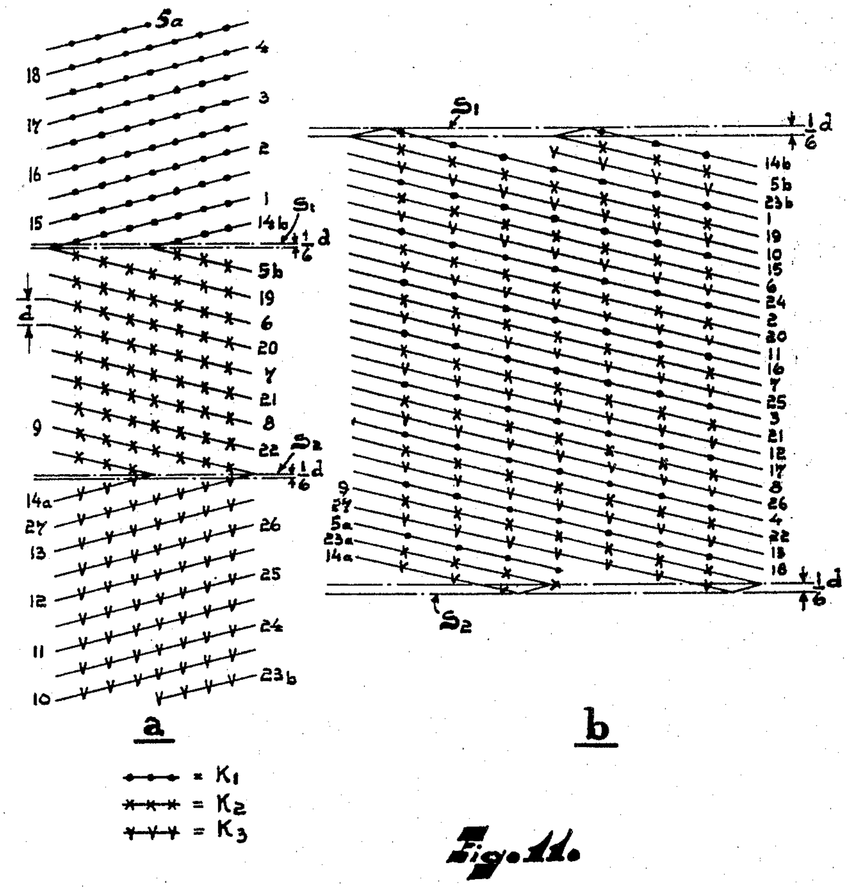

Fig. 1 shows an embodiment of the invention in which the kaleidoscopic-optical system is formed by two parallel mirrors, Fig. 2 shows a receiver device employing a Schmidt optical system, Fig. 3 shows an embodiment of the invention employing a kaleidoscopic-optical system formed by two plane mirrors arranged about a common axis and perpendicular to each other, Fig. 4 shows a variation of the system of Fig. 3 in which the line of intersection of the mirrors is displaced from the optical axis of the system, Fig. 5 shows the interlaced color field produced by the system of Fig. 1, Fig. 6 illustrates scanning wave forms for use with the systems of Figs. 3 and 4, Fig. 7 shows a circuit for producing alternating saw tooth wave forms, Fig. 8 shows a circuit illustrating the principle of operation of the circuit of Fig. 7, Fig. 9 illustrates scanning wave forms for use with systems shown in Figs. 1 and 2, Fig. 10 shows scanning diagrams for the systems of Figs. 1 and 2, Fig. 11 shows further scanning diagrams for the systems of Figs. 1 and 2, Fig. 12 shows scanning diagrams for the systems of Figs. 3 and 4, Fig. 13 illustrates a standard color triangle.

Referring to Fig. 1, 1 designates the coloured object to be transmitted, of which a real image 3 is formed between two flat mirrors 4 and 5 with the use of a lens 2, the mirrors being parallel to one another and arranged at equal distances above and below the optical axis.

Of the real image 3 are thus formed a series of virtual images 6, 7, 6*a*, 7*a*, and so forth, of which only the primary images 6 and 7 will be considered; together with the real image 3, they are reproduced by a lens 8 on the mosaic 9 of an iconoscope 10.

The images 6′, 3′ and 7′ thus produced fall on three different strips 11, 12 and 13 of the mosaic, each of which is provided with a photo-emitting substance, which substances are sensitive, for example, to red, blue and green light respectively, the light-collecting sides of the strips being covered by filters allowing red, blue and green respectively to pass.

An electron ray 14, focused by means of focussing coil 15 and deflected by means of deflecting coils 16 and 17, scans the mosaic in the same manner as that generally used with black-white television.

The fluctuating currents between the conducting electrode 18 on the mosaic and the collecting electrode 19, which currents are produced by the cathode-ray scanning the "red" and the "green" charge images on the photo-emitting side of the mosaic, set up across resistance 20 video voltages, which are then amplified, provided with synchronizing pulses, caused to modulate a carrier wave and emitted.

At the receiver end the iconoscope 10 may be assumed to be replaced by a cathode-ray tube comprising a screen, of which the strips corresponding to 11, 12 and 13 are provided with a red, blue and green fluorescent substance respectively, the beam current being modulated by the incoming video voltages, the beam being controlled by deflecting members which are synchronized with the use of the synchronizing signals.

The red, blue and green images thus produced are then combined by an optical system similar to that shown in Fig. 1 to form one picture which contains all the original colours and which is caused to appear on a frosted glass which is arranged at the position occupied by the object 1 or the image 3 of Fig. 1.

Fig. 2 shows, by way of example, a further form of a receiver device for use in the system according to the invention, use being made of a so-called Schmidt optical system, and the strips 21, 22 and 23 of the cathode-ray tube 24 being again, for example, red, blue and green fluorescent.

Via a concave mirror 25 and an aspherical correcting lens 26 the three images on the tube 24 are reproduced in the plane *ab*. Omission of the mirrors 28 and 29 would cause three real images 21′, 22′ and 23′ to be produced in this plane, which images could be collected on a frosted glass screen. Owing to the presence of the plano-parallel mirrors 28 and 29 which are spaced from the optical axis by equal distances and which are arranged so as to intersect the plane *ab* in the direction of the dividing-lines between the images 21′, 22′ and 23′ respectively, the images 21′ and 23′ are reversed to form images 21″ and 23″, which are caused to coincide with the image 22′ already available, so that synthesis of the three images takes place on a frosted glass screen 27. The picture on the frosted glass screen 27 may be observed by the spectator at 30.

In carrying out the system according to the invention with the use of the transmitting and receiving devices above described several additional difficulties of practical nature arise.

Variations of the anode voltage of the image-producing tube or of the reproducing tube subject the scanning raster to an expansion or a contraction with respect to its centre, so that the images of different colours are shifted relatively to one another.

Due to the available deflecting means electronic raster distortion is liable to occur, the raster thus departing from a rectangular shape, so that satisfactory reassembling of the three coloured images at the receiver end is only achieved where the defects at the transmitter and at the receiver ends are identical; a condition that is substantially impossible to realize.

These distortions are image-symmetrical relatively to the two deflection directions, which are at right angles to one another, and consequently also radial-symmetrical relatively to the centre of the scanning raster.

Furthermore, optical image distortion is liable to occur and if it is different at the transmitter and at the receiver ends, to result in imperfect coincidence of the coloured images.

This distortion is rotation symmetrical relatively to the point of intersection of the optical axis with the image plane.

The said sources of trouble can be obviated if, according to a further form of the system embodying the invention, the kaleidoscopic systems, which are housed in the optical systems at the transmitter and at the receiver ends, each comprise two flat mirrors, which are at right angles to one another and each of which is parallel or substantially parallel to one of the deflection directions.

A transmitting device comprising a kaleidoscope of this kind is shown in Fig. 3. The mirrors 31 and 32 form kaleidoscopic virtual images 33*a* (by reflection via 31), 33*b* (by reflection via 31 and 32) and 33*c* (by reflection via 32) of the object 33 to be emitted. They are projected by the lens 34 on to the mosaic of the picture scanning tube 36 to form images 35, 35*a*, 35*b* and 35*c* respectively. Since the mirrors 31 and 32 intersect the mosaic in the direction of two lines passing through the scanning centre and parallel to the deflection directions 37 and 38, these images are radial-symmetrical relatively to the centre 39 and image-symmetrical relatively to the deflection axes.

The fields upon which images 35 to 35*c* inclusive fall are sensitive to four colours $k_1$, $k_2$, $k_3$ and $k_4$ respectively. Since analysis into three fundamental colours suffices, two of these colours may be chosen to be equal.

At the receiver end the order is reversed and if 36 designates the cathode-ray tube of which the parts from 35 to 35*c* of the fluorescent screen reproduce the colours from $K_1$ to $K_4$, and of the mirrors 31 and 32 were absent, these parts would be reproduced by the lens 34 to form images 33, 33*a*, 33*b* and 33*c*, respectively. However, by mirrors 31 and 32 they are assembled to form a single picture 33, which may be produced, for example, on a frosted glass screen.

Complete coincidence of the images thus only requires that during the sweep the deflection currents at the transmitter and receiver ends are exactly radial-symmetrical relatively to the centre 39.

The aforesaid effects thus only entail distortion of the total picture 33 relatively to the right-hand lower corner but there is no shift of the colours relatively to one another.

The arrangement shown in Fig. 3 has an additional limitation in that only one fourth part of the aperture of the optical system is used.

If the aforesaid optical distortion is negligible, use may be made with advantage of the arrangement shown in Fig. 4, the cathode-ray tube being displaced outside the optical axis so that the mirrors fall outside the aperture of the optical system, the arrangement of the mirrors being, however, such that these mirrors intersect the plane in which the picture 33 is produced on lines which are optically conjugated with the lines of intersection of the colour zones on the screen of the tube 36. The arrangement is otherwise similar to that of Fig. 3 and corresponding parts are designated by like reference numerals.

The use of the transmission system according to the invention, particularly in the case of kaleidoscopic systems having two parallel mirrors, reveals a favourable possibility of colour interlacing.

This possibility will be described more fully with reference to Figs. 1 and 5.

As shown in Fig. 1, at the transmitter end the object to be transmitted 1 is projected onto the mosaic screen with the use of a mirror system 4, 5, three different images being produced. Thus, if they are there scanned progressively, that is to say without interlacing, it has the effect that at the receiver end are written, for example, the horizontal lines 1 up to and including 11. Of these, for example as shown in Fig. 5, the lines 1 up to and including 4 fall in the red image, the lines 5 up to and including 7 in the blue image and the lines 8 up to and including 11 in the green image.

If the spacing of these lines is $d$ and the mirrors $S_1$ and $S_2$ of the kaleidoscopic system for the re-assembly of the coloured images are spaced apart by $\frac{1}{6}d$ below the line 4 and above the line 8 respectively, the reflected red and green raster lines 1' up to and including 4' and 8' up to and including 11' respectively become located between the blue raster lines 5 up to and including 7 in such manner that threefold colour interlacing results and this is therefore obtained without additional auxiliary means or electrical complications.

The advantage of colour interlacing is to be seen in the fact that, although the vertical definition for parts in the picture which exhibit one of the fundamental colours (in this case red, blue or green) is smaller for mixed colours, which occur more frequently, the full definition is available.

This, consequently, permits a reduction of the electrical bandwidth. In the solutions outlined with reference to Figs. 3 and 4 the colour interlacing described may also be used, but, as a matter of course, it is here only twofold.

It should be noted in addition that the boundaries of the colour zones need not coincide with the edges of the object to be transmitted, but that the colour zone will generally be enlarged, so as to have available some additional scanning line spacings, for example for "blanking" purposes.

As already observed in the description of Figs. 3 and 4, although the most important sources of disabilities are obviated in the systems therein shown, it is nevertheless necessary that during the sweep the deflection voltages or currents should be radial-symmetrical relatively to the centre 39.

Most of the sawtooth voltages or currents, however, exhibit a certain divergence from the straight-line relationship and if this divergence is not radial-symmetrical relatively to the zero point, this results during reproduction in relative shift of the images of different colours.

In practice it is very difficult to ensure that the scanning in a horizontal or vertical direction respectively is radial-symmetrical relatively to horizontal or vertical dividing-lines respectively of the colour zones if the scanning beam in passing one of these dividing-lines continues to follow the same direction.

The scanning method used has a further disadvantage in that, since the images on the scanned colour zones are image-symmetrical relatively to the dividing-lines, the image content is recorded for the first half of the scanning operation in the reverse sense as for the second half of the scanning operation. This remark applies both to the horizontal and the vertical scanning. It is thus essentially impossible to actuate a normal black-white receiver with the use of the image signal emitted by the transmitter. According to the invention a material improvement may be obtained, if the currents or voltages acting upon the line or image scanning are caused to vary, for the devices shown in Figs. 3 and 4, in the manner shown in Fig. 6*a* or Fig. 6*b*.

Here the deflection voltages or currents are therefore of a periodic nature so that as shown, for example, in Fig. 6*a* a slow, substantially linear increase from zero to a maximum value occurs during half a period and at the end of the first half of the period abrupt recurrence to zero occurs followed by a half period in which the same wave form occurs, but with negative polarity.

The scanning of image-symmetrical colour zones is now effected in an image-symmetrical manner, so that, for example in Fig. 3 with horizontal deflection current as shown in Fig. 6*a*, the beam moves from the vertical line through the centre 39 first to the right and finds its way into the colour range 35*c*, then at the end of the first half of the period is rapidly returned to the vertical dividing-line. The beam then slowly penetrates into the zone 35*b*, and at the end of the second half of the period rapidly returns to the vertical dividing-line. Since the image content for the various colour zones is scanned in the same order, it will also be possible for the image of the colour transmitter to be received with a black-white receiver, of which the line or image frequencies respectively are suitably chosen.

Moreover, this method of scanning permits a far more ready realization of exact symmetry of the scanning with respect to the dividing-lines of the colour zones, since it is possible to derive the two sawtooth parts, from which a period of the sweep is built up, from the same sawtooth generator which operates with double the number of cycles per second. It is no longer necessary that the voltages produced by this generator should be exactly linear, since exact symmetry of the ultimate deflection only depends on the manner in which the curves of Fig. 6*a* and Fig. 6*b* respectively are built up from the given sawtooth curve.

The fact that this can be carried out with great accuracy is illustrated, by way of example, by the form shown in Fig. 7, of which the principle is first set out with reference to Fig. 8.

Use is assumed to be made of magnetic deflection 51 designating the deflection coil. S designates a polarity changing switch by means of which the coil 51 is included in the anode circuit of the tube 56, the control-grid of which is supplied with sawtooth voltages. It is assumed that at each fly-back of this sawtooth S is changed over from position *a* to *b* and conversely. It is obvious that the current passing through the deflection coil 51 will thus vary in the manner shown in Fig. 6. So long as the cross-over contacts of S are of equal value in both positions, or remain of negligible value relatively to the resistance of the deflection coil, such a device is obviously adapted to produce an accurately symmetrical deflection current of the kind shown in Fig. 6.

Fig. 7 shows, by way of example, one embodiment comprising an automatic electronic change of connections, the deflection coil 51 being supplied from the secondary 52 of a transformer whose primary proper is designated 53. 54 and 55 designate auxiliary windings. The polarity-changing "switch" is constituted here by four gas-filled triodes 57, 58, 59 and 60, the control-grids of which are provided with suitable bias voltages through resistances 61, 62, 63 and 64 and are controlled by the auxiliary windings 54 and 55 through small condensers 65, 66, 67 and 68.

The idea is that the gas-filled triodes are conducting in pairs during successive sweeps, for example, 57 and 58 during the even sweep and 59 and 60 during the odd sweeps.

If tubes 57 and 58 are assumed to be conducting, the current in winding 53 increases in a sawtooth-like manner from the left to the right. Since the sawtooth voltage shown in Fig. 8 exhibits peaks, the tube 56 is completely cut off for a short period at the next fly-back. The gas-filled triode 58 is thus immediately extinguished, but owing to the presence of stray capacity across winding 53, tube 57 will continue to be conductive for a short period and an intense positive voltage peak is produced across the auxiliary winding 55, with the result that tubes 59 and 60 become conducting, since their grids are thereby controlled through capacitors 67 and 68. As soon as the current in winding 53 tends to change its direction, i. e. at the end of the fly-back, the tube 57 is extinguished and the next sweep begins, tubes 59 and 60 remaining conductive. At the end of this sweep tube 60 is extinguished, tubes 57 and 58 become conducting and finally tube 59 is extinguished. Then the same performance is repeated.

The devices shown in Figs. 1 and 2 may also be adapted by a different scanning method for reception by normal black-white receivers and in this case the deflection current or voltage which acts upon the scanning at right angles to the dividing-lines between the colour zones must have a wave form as shown in Figs. 9*a* or 9*b*. According to the invention, the sawtooth parts from which one period of the deflection current or voltage is built up, are also derived with advantage from the same sawtooth generator having three times the number of cycles per second. This may be achieved, for example, with the use of a triple commutation of one or more sets of deflection coils.

In order to ascertain how the scanning by the method proposed by the invention varies for the various kaleidoscopic devices referred to and the manner in which black-white receivers will receive the colour signal, several examples will be set out hereinafter.

The prior black-white system to which the colour system should be adapted is assumed to be characterized by the following data:

Number of lines: $n$ (odd)
Interlacing: 2:1,
Image recurrence frequency: $f_b$.

It follows that

Line frequency$=nf_b$
Image frequency$=2f_b$ (flicker frequency)

It is assumed hereinafter that the colour system will be required to operate with synchronizing pulses similar to those of the black-white system. If we consider first of all the system having three colours in three parallel strips, which at the receiver end are assembled with the use of two planoparallel mirrors $S_1$ and $S_2$, there are two possibilities:

*a*. The strips are at right angles to the line scanning direction. Fig. 10*a* illustrates how scanning proceeds for $n=9$ lines, if the horizontal scanning is carried out in the manner shown in Fig. 9*a* and Fig. 10*b* shows the result obtained if the rasters are assembled with the use of the mirrors $S_1$ and $S_2$. There are consequently produced again 9 lines which alternately have the colours $K_1$, $K_2$ and $K_3$ (triple colour interlacing). The numerals 1 up to and including 9 near the lines indicate the order in which the lines are scanned. The electrical interlacing remains double so that the flicker frequency per colour remains equal to the flicker frequency of the black-white image ($2f_b$). However the definition per colour is only one third of the definition of the black-white image.

*b*. The strips are at right angles to the image scanning. Fig. 11*a* illustrates the scanning diagram for $n=9$ lines, if the image scanning proceeds in accordance with Fig. 9*a*. There are produced three superposed complete rasters of 9 lines for each colour, which are image-symmetrical relatively to the dividing lines between the colour fields. These rasters may be assembled in two ways:

1. By mirrors $S_1$ and $S_2$ following the dividing lines between the colour fields, a 9-lines image being thus again produced of which the even lines are successively scanned by colour $K_1$, the odd lines by colour $K_2$ and the even lines by colour $K_3$ and then the odd lines by $K_1$, $K_2$ and $K_3$ respectively, and so forth. Consequently, the scanning diagram corresponds to the system used with the mechanico-electronic principle referred to in the preamble. We, consequently, find here a method of receiving such a signal without moving parts.

On comparison with the black-white system having identical synchronizing pulses it is therefore found that:

Definition entire image=definition per colour=$n$ lines.
Electrical interlacing: 2:1, so
Flicker frequency irrespective of colour=$2f_b$
Flicker frequency per colour=$\frac{2}{3}f_b$, i. e. three times smaller than the flicker frequency of the black-white image.

2. By mirrors $S_1$ and $S_2$ shifted to one sixth of the line spacing relatively to the dividing lines of the colour fields (Fig. 11). Fig. 11*b* shows the scanning diagram thus obtained, in which 27 lines are produced with triple colour interlacing. Consequently, here definition total image $=3n$ lines, Definition per colour=$n$ lines
Colour interlacing=3:1
Electrical interlacing=2:1
Flicker frequency irrespective of colour=$2f_b$
Flicker frequency per colour=$\frac{2}{3}f_b$ It is assumed that the mirrors at the transmitter end are also shifted by $\frac{1}{6}d$. We thus find here a method of tripling the vertical definition of the mechanico-electronic system without any increase in bandwith by the use of triple colour interlacing. This involves no electrical complications at the receiver end but is simply achieved by a small shift of the mirrors.

*c*. Next we consider the devices shown in Figs. 3 and 4, in which use is made of four colour zones having the colours $K_1$ up to and including $K_4$. Assuming the horizontal and vertical scanning to proceed in accordance with Fig. 6*a*, the colour scanning diagram corresponding to 9 lines black-white is shown in Fig. 12*a*. The lines are numbered in the order in which they are traversed.

Assembling with the use of mirrors $S_1$ and $S_2$ (in accordance with Figs. 3 and 4) results in the raster shown in Fig. 12*b* comprising 9 lines, of which 4½ are traversed with colours $K_1+K_2$ and 4½ with the colours $K_3+K_4$. In general the features consequently are:

Definition total image=$n$ lines
Definition per colour=$\frac{1}{2}n$ lines as a minimum
Electrical interlacing=absent owing to even number per cycle.
Colour interlacing=2:1
Flicker frequency irrespective of colour=$2f_b$
Flicker frequency per colour=$f_b$ as a minimum
Image recurrence frequency=$\frac{1}{2}f_b$.

In accordance with a further feature of the invention it will now be of advantage to choose the colours $K_1$ up to and including $K_4$ to be such that in the colour triangle of Fig. 13 the white-point W lies both on the line connecting $K_1$ and $K_2$ and on that connecting $K_3$ and $K_4$. This is only possible by the use of four colours and has the advantage that for white parts in the picture, which are of frequent occurrence, the definition becomes equal to $n$ lines instead of to $\frac{1}{2}n$ lines.

It will be obvious that the definition per colour is $\frac{1}{2}n$ lines as a minimum (that is to say if the colour coincides with one of the corners of the quadrilateral $K_1$, $K_2$, $K_3$, $K_4$ of Fig. 13) but that for all other points of the cross-hatched quadrilateral of Fig. 13 the definition is greater and lies between $\frac{1}{2}n$ and $n$ lines.

Furthermore the flicker frequency per colour is $f_b$ as a minimum (half the flicker frequency of the black-white image) i. e. if the colour coincides with one of the elementary colours $K_1$ up to and including $K_4$. Any colour inside the quadrilateral $K_1$, $K_2$, $K_3$, $K_4$ of Fig. 13 will have a component in each of the colour fields, so that all the lines reproduce a small quantity thereof; consequently, the flicker frequency per colour will be between $f_b$ and $2f_b$ (the maximum value is reached at the white-point).

The use of four colours has the additional advantage the colour triangle can comprise a larger range of tones than in the case of three elementary colours.

Next, it is ascertained that the effects of a colour signal received by a black-white receiver, in the aforesaid cases *a*, *b* and *c* are:

*a*. Maximum vertical definition=$n$ lines (for initially white parts); minimum vertical definition=$\frac{1}{3}n$ lines (for the fundamental colours). The mean definition lies between these limits. The flicker frequency remains unaltered.

$b_1$. Vertical definition, irrespective of the initial colour of the image part, remains $n$ lines. Flicker frequency: maximum $3f_b$ (for initially white parts); flicker frequency minimum=$\frac{1}{3}f_b$ (for parts which initially had one of the fundamental colours). On an average, the flicker frequency thus lies between that of the black-white system and one-third thereof.

$b_2$. Maximum vertical definition=$3n$ lines (for initially white parts); minimum vertical definition=$n$ lines (for parts which initially had one of the fundamental colours); flicker frequency: vide $b_1$.

*c*. Here the maximum vertical definition is $n$ lines i. e. for parts which initially had a colour in which either $K_1$ and $K_4$ or $K_2$ and $K_3$ or $K_4$ and $K_2$ or $K_3$ and $K_1$ are contained as components of approximately equal intensity, that is to say for all the colours in the proximity of the lines *a* and *b* of Fig. 13. In this case the flicker frequency remains $2f_b$. The minimum vertical definition becomes $\frac{1}{2}n$ lines, i. e. for parts which initially had a colour lying in the proximity of one of the fundamental colours.

In these conditions the flicker frequency becomes half its value, i. e. $f_b$.

This possibility is, however, comparatively small.

When changing from a black-white system to a colour system, as above described, the synchronizing pulses were assumed to remain unaltered. This also implies that the bandwidth was maintained. It is obvious that, as a matter of fact, for example with a three-colour system, while maintaining the full definition under all circumstances, a three times larger bandwidth would be required.

Correspondingly, it is found that the change from black-white to colour, while maintaining the synchronizing pulses and the bandwidth, proceeds in general at the expense of the definition per colour and/or the flicker frequency per colour.

In the system *a*, a factor 3 is sacrificed to the vertical definition per colour. This is only justified if the black-white system that was considered had already an excessive vertical definition for black-white reproduction.

In the systems *a*, *b*, a factor 3 is sacrificed to the flicker frequency per colour and this is only justified if the flicker frequency of the black-white system was initially three times too high. The arrangement is, however, more favourable for the four colour system. First of all the reproduction of the colour signal by a black-white receiver remains tolerable. Furthermore, in the case of a suitable choice of the fundamental colours, the maximum definition per colour becomes only twice as bad (but on an average better than that), the same observation applying to the flicker frequency per colour.

In order that the same bandwidth may suffice, a few concessions should therefore be made as regards the definition and the flicker frequency.

However, the quality of the colour picture being the same, the four-colour system is found to require a smaller band width than in the case of the three-colour system.

What I claim is:

1. A television system for a colored picture, comprising an image camera tube having a light sensitive screen, means to form on said screen multiple images of said picture, means to analyze said multiple images to produce signal currents having variations proportional to the color content and contrast variations of said multiple images, an image generating tube having a screen, means to apply said signal currents to said generating tube and to form on the screen thereof second multiple images having color content and contrast variations proportional to the variations of said signal currents, two plane mirrors arranged about a common axis and having the surfaces thereof arranged parallel to said axis and facing each other, and means to transmit said second multiple images along the said axis to combine the same to form a composite image of said second multiple images.

2. A television system for a colored picture, comprising two plane mirrors arranged about a common axis and having the surfaces thereof arranged parallel to the said axis and facing each other, an image camera tube having a light sensitive screen, means to transmit a real image of said picture along said axis to thereby form on said screen multiple images of said picture, means to analyze said multiple images to produce signal currents having variations proportional to the color content and contrast variations of said multiple images, an image generating tube having a screen, means to apply said signal currents to said generating tube and to form on the screen thereof second multiple images having color content and contrast variations proportional to the variations of said signal currents, two plane mirrors arranged about a common axis and having the surfaces thereof arranged parallel to the said latter axis and facing each other, and means to transmit said second multiple images along said latter axis to combine the same to form a composite image of said second multiple images.

3. A television system for a colored picture, comprising two plane mirrors arranged about a common axis and having the surfaces thereof arranged parallel to the said axis and parallel to each other, an image camera tube having a light sensitive screen, means to transmit a real image of said picture along said axis to thereby form on said screen multiple images of said picture, means to analyze said multiple images to produce signal currents having variations proportional to the color content and contrast variations of said multiple images, an image generating tube having a screen, means to apply said signal currents to said generating tube and to form on the screen thereof second multiple images having color content and contrast variations proportional to the variations of said signal currents, two plane mirrors arranged about a common axis and having the surfaces thereof arranged parallel to the said latter axis and parallel to each other, and means to transmit said second multiple images along said latter axis to combine the same to form a composite image of said second multiple images.

4. A television system for a colored picture, comprising two plane mirrors arranged about a common axis and having the surfaces thereof arranged parallel to the said axis and parallel to each other, an image camera tube having a light sensitive screen, means to transmit a real image of said picture along said axis to thereby form on said screen multiple images of said picture separated by dividing lines, means to analyze said multiple images in a direction substantially perpendicular to said dividing lines to produce signal currents having variations proportional to the color content and contrast variations of said multiple images, an image generating tube having a screen, means to apply said signal currents to said generating tube and to form on the screen thereof second multiple images having color content and contrast variations proportional to the variations of said signal currents, two plane mirrors arranged about a common axis and having the surfaces thereof arranged parallel to the said latter axis and parallel to each other, and means to transmit said second multiple images along said latter axis to combine the same to form a composite image of said second multiple images.

5. A television system for a colored picture, comprising an image camera tube having a light sensitive screen divided into three parallel color sensitive strips by dividing lines, two plane mirrors arranged about a common axis and parallel to the said dividing lines and parallel to the said axis, parallel to each other and being located respectively at the levels of the said dividing lines, means to transmit a real image of said picture along said axis and between said mirrors to thereby form on said screen multiple images of said picture, means to analyze said multiple images to produce signal currents having variations proportional to the color content and contrast variations of said multiple images, an image generating tube having a screen divided into three parallel color responsive sections by dividing lines, means to apply said signal currents to said generating tube and to form on the screen thereof second multiple images having color content and contrast variations proportional to the variations of said signal currents, two plane mirrors arranged about a common axis parallel to said dividing lines and parallel to the said latter axis, parallel to each other and being located respectively at the levels of the said dividing lines, and means to transmit said multiple image along said latter axis to combine the same to form a composite image of said second multiple images.

6. A television system for a colored picture, comprising an image camera tube having a light sensitive screen divided into three parallel color sensitive strips by dividing lines, two plane mirrors arranged about a common axis and parallel to the said dividing lines and having the surfaces thereof arranged parallel to the said axis and parallel to each other, means to transmit a real image of said picture along said axis to thereby form on said screen multiple images of said picture, means to scan said multiple images into a plurality of lines to produce signal currents having variations proportional to the color content and contrast variations of said multiple images, an image generating tube having a screen divided into three parallel color responsive sections by dividing lines, means to apply said signal currents to said generating tube to form on the screen thereof second multiple images having color content and contrast variations proportional to the variations of said signal currents, two plane mirrors arranged about a common axis parallel to said dividing lines and having the surfaces thereof arranged parallel to the said latter axis, parallel to each other and means to transmit said second multiple images along said latter axis to combine the same to form a composite image of said second multiple images, the mirrors of said first and said second groups of parallel mirrors being separated respectively by a distance approximately equal to the spacing between the said dividing lines diminished by one third the distance between two adjacent scanning lines.

7. A television system for a colored picture, comprising two plane mirrors arranged about a common axis and having the surfaces thereof arranged parallel to the said axis and parallel to each other, an image camera tube having a light sensitive screen, a positive lens located between said tube and said mirrors and having the optical axis thereof coincide with the common axis of said plane mirrors to transmit a real image of said picture along said axis to thereby form on said screen multiple images of said picture, means to analyze said multiple images to produce signal currents having variations proportional to the color content and contrast variations of said multiple images, an image generating tube having a screen, means to apply said signal currents to said generating tube and to form on the screen thereof second multiple images having color content and contrast variations proportional to the variations of said signal currents, two plane mirrors arranged about a common axis and having the surfaces thereof arranged parallel to the said latter axis and parallel to each other, a positive lens located between said generating tube and said latter mirrors and having the optical axis thereof coincide with the common axis of said latter plane mirrors to transmit said multiple images along said axis to combine the same to form a composite image of said second multiple images.

8. A television system for a colored picture, comprising two plane mirrors arranged about a common axis and having the surfaces thereof arranged parallel to the said axis and perpendicular to each other, an image camera tube having a light sensitive screen, means to transmit a real image of said picture along said axis to thereby form on said screen multiple images of said picture, means to analyze said multiple images to produce signal currents having variations proportional to the color content and contrast variations of said multiple images, an image generating tube having a screen, means to apply said signal currents to said generating tube and to form on the screen thereof second multiple images having color content and contrast variations proportional to the variations of said signal currents, two plane mirrors arranged about a common axis and having the surfaces thereof arranged parallel to the said latter axis and perpendicular to each other, and means to transmit said multiple images along said latter axis to combine the same to form a composite image of said second multiple images.

9. A television system for a colored picture, comprising two plane mirrors arranged about a common axis and having the surfaces thereof arranged parallel to the said axis and intersecting each other perpendicularly along said axis, an image camera tube having a light sensitive screen, means to transmit a real image of said picture along said axis to thereby form on said screen multiple images of said picture separated by dividing lines the point of intersection of which is intersected by said axis, means to analyze said multiple images to produce signal currents having variations proportional to the color content and contrast variations of said multiple images, an image generating tube having a screen, means to apply said signal currents to said generating tube and to form on the screen thereof second multiple images separated by dividing lines intersecting at a point having color content and contrast variations proportional to the variations of said signal currents, two plane mirrors arranged about a common axis and having the surfaces thereof arranged parallel to the said latter axis and intersecting each other perpendicularly along said latter axis, said common latter axis intersecting the juncture of said dividing lines and means to transmit said multiple images along said latter axis to combine the same to form a composite image of said second multiple images.

10. A television system for a colored picture, comprising two plane mirrors arranged about a common axis and having the surfaces thereof arranged parallel to the said axis and intersecting each other perpendicularly along said axis, an image camera tube having a light sensitive screen, means to transmit a real image of said picture along said axis to thereby form on said screen multiple images separated by dividing lines of said picture, means to analyze said multiple images symmetrically about one of said dividing lines to produce signal currents having variations proportional to the color content and contrast variations of said multiple images, an image generating tube having a screen, means to apply said signal currents to said generating tube and to form on the screen thereof second multiple images having color content and contrast variations proportional to the variations of said signal currents, two plane mirrors arranged about a common axis and having the surfaces thereof arranged parallel to the said latter axis and perpendicular to each other, and means to transmit said multiple images along said latter axis to combine the same to form a composite image of said second multiple images.

11. A television system for a colored picture, comprising two plane mirrors arranged about a common axis and having the surfaces thereof arranged parallel to the said axis and perpendicular to each other, an image camera tube having a light sensitive screen separated into four symmetrical zones each responsive to a different color, means to transmit a real image of said picture along said axis to thereby form on said screen four images of said picture, means to analyze said images to produce signal currents having variations proportional to the color content and contrast variations of said images, an image generating tube having a screen separated into four symmetrical zones each responsive to a different color, means to apply said signal currents to said generating tube and to form on the screen thereof a second group of four images having color content and contrast variations proportional to the variations of said signal currents, two plane mirrors arranged about a common axis and having the surfaces thereof arranged parallel to the said latter axis and perpendicular to each other, and means to transmit said images along said axis to combine the same to form a composite image of said second group of images.

12. A system as claimed in claim 11 characterized in that the symmetrical color zones of the image camera tube and the image generating tube respectively are responsive to colors so related that on a standard color triangle the intersection of a line joining two of said colors with the line joining the other two colors will coincide approximately with the white point of the color triangle.

13. A television system for a colored picture, comprising two plane mirrors arranged about a common axis and having the surfaces thereof arranged parallel to the said axis and intersecting each other perpendicularly to form a line of intersection, an image camera tube having a light sensitive screen, a positive lens located between said mirrors and said camera tube, the optical axis of which coincides with said line of intersection to transmit a real image of said picture along said axis to thereby form on said screen multiple images of said picture, means to analyze said multiple images to produce signal currents having variations proportional to the color content and contrast variations of said multiple images, an image generating tube having a screen, means to apply said signal currents to said generating tube and to form on the screen thereof second multiple images having color content and contrast variations proportional to the variations of said signal currents, two plane mirrors arranged about a common axis and having the surfaces thereof arranged parallel to the said latter axis and intersecting each other perpendicularly to form a line of intersection, and a second positive lens located between said generating tube and said latter mirrors, the optical axis of which coincides with said line of intersection to transmit said multiple images along said latter axis to combine the same to form a composite image of said second multiple images.

14. A television system for a colored picture, comprising two plane mirrors arranged about a common axis and having the surfaces thereof arranged parallel to the said axis and perpendicular to each other, an image camera tube having a light sensitive screen divided into a plurality of zones each responsive to a different color, means to transmit a real image of said picture along said axis to thereby form on said screen multiple images of said picture, means to scan said multiple images to produce signal currents having variations proportional to the color content and contrast variations of said multiple images comprising, a source of a deflecting electrical quantity having positive and negative variations of substantially saw tooth wave form and substantially mirror images of each other, an image generating tube having a screen, means to apply said signal currents to said generating tube and to form second multiple images having color content and contrast variations proportional to the variations of said signal currents, two plane mirrors arranged about a common axis and having the surfaces thereof arranged parallel to the said latter axis and perpendicular to each other, and means to transmit said multiple images along said latter axis to combine the same to form a composite image of said second multiple images.

15. A television system for a colored picture, comprising two plane mirrors arranged about a common axis and having the surfaces thereof arranged parallel to the said axis and parallel to each other, an image camera tube having a light sensitive screen means to transmit a real image of said picture along said axis to thereby form on said screen multiple images of said picture, scanning means comprising, a source of deflecting electrical quantity having a first linearly varying saw tooth component, a second linearly varying saw tooth component substantially a mirror image of said first component and a third linearly varying saw tooth component substantially a mirror image of said second component, to produce signal currents having variations proportional to the color content and contrast variations of said multiple images, an image generating tube having a screen, means to apply said signal currents to said generating tube and to form on the screen thereof second multiple images having color content and contrast variations proportional to the variations of said signal currents, two plane mirrors arranged about a common axis and having the surfaces thereof arranged parallel to the said latter axis and parallel to each other, and means to transmit said multiple images along said latter axis to combine the same to form a composite image of said second multiple images.

16. A television system for a colored picture, comprising two plane mirrors arranged about a common axis and having the surfaces thereof arranged parallel to the said axis and perpendicular to each other, an image camera tube having a light sensitive screen divided into a plurality of zones each responsive to a different color, means to transmit a real image of said picture along said axis to thereby form on said screen multiple images of said picture, means to scan said multiple images to produce signal currents having variations proportional to the color content and contrast variations of said multiple images comprising, a source of a deflecting electrical quantity including a source of cyclic saw tooth control voltage, an inductance element and switch means to alternately couple said saw tooth voltage to said inductance element with opposite polarity during each successive cycle of said saw tooth voltage to produce a deflecting electrical quantity having positive and negative variations of substantially saw tooth wave form and substantially mirror images of each other, an image generating tube having a screen, means to apply said signal currents to said generating tube and to form on the screen thereof second multiple images having color content and contrast variations proportional to the variations of said signal currents, two plane mirrors arranged about a common axis and having the surfaces thereof arranged parallel to the said latter axis and perpendicular to each other, and means to transmit said multiple images along said latter axis to combine the same to form a composite image of said second multiple images.

17. A television transmitter for a colored picture, comprising two plane mirrors arranged about a common axis and having the surfaces thereof arranged parallel to the said axis and facing each other, an image camera tube having a light sensitive screen, means to transmit a real image of said picture along said axis to thereby form on said screen multiple images of said picture, and means to analyze said multiple images to produce signal currents having variations proportional to the color content and contrast variations of said multiple images.

18. A television transmitter for a colored picture, comprising two plane mirrors arranged about a common axis and having the surfaces thereof arranged parallel to the said axis and facing each other, an image camera tube having a light sensitive screen, means to transmit a real image of said picture along said axis to thereby form on said screen multiple images of said picture separated by dividing lines, and means to analyze said multiple images in a direction substantially perpendicular to said dividing lines to produce signal currents having variations proportional to the color content and contrast variations of said multiple images.

19. A television receiver adapted to receive signal currents having variations proportional to the color content and contrast variations of a colored picture, comprising an image generating tube having a screen having segmented portions thereof selectively generating light of different color values, means to apply said signal currents to said generating tube and to form on the screen thereof multiple images having color content and contrast variations proportional to the variations of said signal currents, two plane mirrors arranged about a common axis and having the surfaces thereof arranged parallel to said axis and facing each other, and means to transmit said multiple images along the said axis to combine the same to form a composite image of said multiple images.

20. A television receiver adapted to receive signal currents having variations proportional to the color content and contrast variations of a colored picture, comprising an image generating tube having a screen having segmented portions thereof selectively generating light of different color values, means to apply said signal currents to said generating tube and to form on the screen thereof multiple images having color content and contrast variations proportional to the variations of said signal currents, two plane mirrors arranged about a common axis and having the surfaces thereof arranged parallel to said axis and perpendicular to each other, and means to transmit said multiple images along the said axis to combine the same to form a composite image of said multiple images.

GERRIT JAN SIEZEN.

REFERENCES CITED

The following references are of record in the file of this patent:

UNITED STATES PATENTS

| Number | Name | Date |
|---|---|---|
| 2,377,980 | Dumont | Dec. 28, 1943 |
| 2,375,966 | Valensi | May 15, 1945 |
| 2,389,646 | Sleeper | Nov. 27, 1945 |
| 2,465,652 | Legler | Mar. 29, 1949 |